Jan. 9, 1951 K. W. HARPER 2,537,584
SLIDE CARRIER FOR STILL PROJECTORS
Filed June 8, 1946
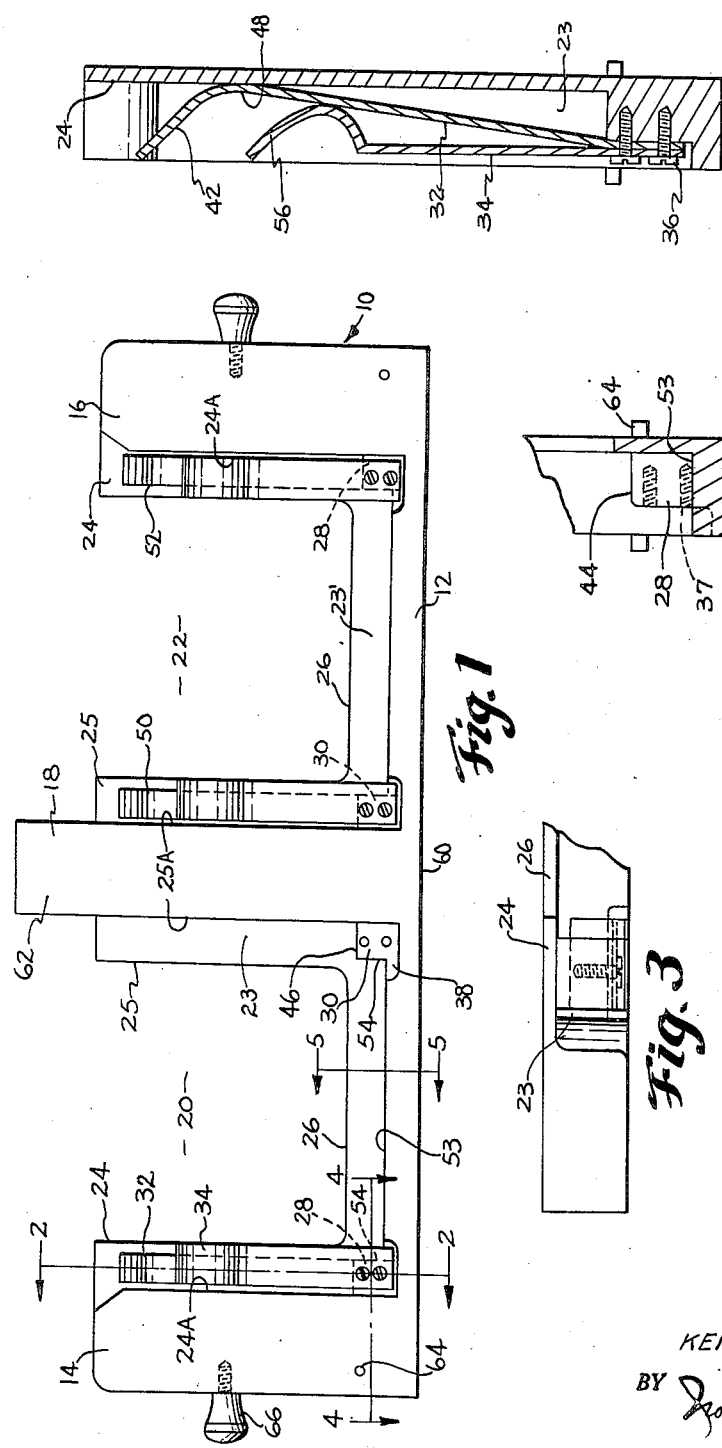
INVENTOR.
KENNARD W. HARPER
BY
ATTORNEY Patented Jan. 9, 1951

2,537,584

UNITED STATES PATENT OFFICE 2,537,584

SLIDE CARRIER FOR STILL PROJECTORS

Kennard W. Harper, Buffalo, N. Y., assignor to American Optical Company, Southbridge, Mass., a voluntary association of Massachusetts Application June 8, 1946, Serial No. 675,421

6 Claims. (Cl. 88—28)

1

This invention relates to projection apparatus and more particularly to slide carriers for properly positioning transparent lantern slides and the like in proper position in a projector for projection purposes.

One well-known form of slide carrier in common use at the present time is arranged as an elongated frame adapted to slide in channels or guideways in the projector and provided with two or more projection openings or apertures spaced longitudinally therein. These openings are so located in the carrier that a slide may be readily slipped into place overlying or aligned with one of the openings or removed therefrom while another slide is being projected. The slide supporting means on such carriers have to be of a definite size and shape in order to properly accommodate and center individual slides of a predetermined size in alignment with these projection openings. In cases where the slides are square they may be placed in the carrier with any edge uppermost. However, many slides are of rectangular shape and in such cases they can be placed in the carrier provided therefor in only a single position, generally with the longer dimension thereof extending longitudinally of the carrier. Since it is also often desirable that certain of such slides be positioned in a projector with the longer side vertical, these carriers of earlier construction have not functioned as satisfactory as might be desired.

The present invention, however, overcomes these difficulties mentioned above by providing a new and improved slide carrier arranged in the form of an elongated frame having spaced projection openings and this slide carrier is so constructed and arranged that it may receive and properly support a slide of a predetermined length and a different predetermined width in alignment with each opening in either an upright position or upon one side edge as desired.

It is, therefore, an important object of this invention to provide a new and improved slide carrier arranged to support a slide of differing length and width in a projector for projection purposes with the slide disposed in an upright position or upon one side edge thereof.

It is a further object of the invention to provide an improved slide carrier of the type mentioned above which is of sturdy and economical construction and arranged with a minimum number of parts.

It is a further object of the invention to provide an improved slide carrier of the character described which may be easily formed, molded or cast and which requires a minimum amount of time and material for finishing same so as to be placed in condition for use.

Other objects and advantages of the present invention will become apparent from the following description, taken in conjunction with the accompanying drawing, in which Fig. 1 is an elevational view of a slide carrier embodying the present invention;

Fig. 2 is a vertical sectional view taken substantially on line 2—2 of Fig. 1 and looking in the direction of the arrows;

Fig. 3 is a fragmentary plan view on an enlarged scale of an end-portion of the slide carrier of Fig. 1;

Fig. 4 is a fragmentary sectional view taken substantially on line 4—4 of Fig. 1 and looking in the direction of the arrows; and Fig. 5 is a fragmentary sectional view taken substantially on line 5—5 of Fig. 1.

Referring to the drawing in detail, it will be seen that the slide carrier generally indicated by numeral 10 comprises an elongated base portion 12 extending between upstanding integral end-portions or arms 14 and 16 which are arranged in spaced relation to an integral upstanding intermediate portion or arm 18 so as to provide projection openings or apertures 20 and 22 at opposite sides of said intermediate portion 18. On the adjacent edges of the end-portions and the intermediate portion are provided inwardly projecting integral flanges 24 and 25 respectively and flanges 26 are arranged to project upwardly from the base portion 12 adjacent projection openings 20 and 22. Side and bottom recesses 23 and 23' are thus formed in the carrier adjacent each opening 20 and 22 by the projecting flanges 24, 25 and 26. Spaces are thus formed between guide surfaces 24A and 25A for receiving lantern slides and the flanges 24 and 25 are arranged to have the slides held thereagainst, by suitable means to be presently described, while the carrier and slides are being moved into position in a projector for projection purposes.

As may be seen in Fig. 1 an integral projection 28 is formed adjacent the intersection of the base portion 12 and each end-portion 14 and 16, said projections being integral with flanges 24 and 26. A similar projection 30 is formed adjacent the junction of the base portion 12 and each side 25A of the intermediate portion 18. The projections 28 and 30 are of similar size and shape and each is arranged to support the lower ends of a relatively long movable arm or spring member 32 and a relatively shorter movable arm or spring member 34 through the medium of suitable attaching means, such as screws 36, extending through apertures in the lower ends of said spring members and into threaded openings 37 in said projections. Springs 32 and 34 have been omitted from the structure at the right side of opening 20 in order to more clearly show projection 30. In order to provide sufficient room for the lower ends of these members a recess 38 is formed in the base portion 12 adjacent each of said projections 28 and 30. Each longer spring 32 is provided, as best seen by Fig. 2, with an outwardly sloping upper end-portion 42 to accommodate a slide as it is forced downwardly between the flanges 24 and 25 and springs 32 and between guide surfaces 24A and 25A into proper position for projection purposes.

When a slide is so positioned in the carrier, its longer dimension will be disposed longitudinally of the carrier and its lower edge will be in engagement with the upper surfaces 44 and 46 of the projections 28 and 30 respectively. It will be noted that the lower edge of the slide in such position extends slightly below the upper edge of the flange 26. An intermediate curved portion 48 of each of these springs 32 bears against a side of the slide and since curved portions 48 engage the slide intermediate the ends of the vertically extending flanges 24 and 25 the slide will be held properly in a vertical position in engagement with these flanges.

Since the slides are of a lesser predetermined width than length, the opposite inner edges 50 and 52 of each pair of movable arms or springs 32 are arranged in a predetermined spaced relation to provide a slide receiving space therebetween to accommodate the shorter dimension of the slides. Edges 50 and 52 act as guides as a slide is pressed downwardly into place overlying the projection opening 20 or 22 and with the shorter dimension of the slide extending parallel to the base portion 12. The slide may be moved downwardly until its lower edge comes into engagement with an edge portion 53 of the slide carrier and between the vertical edges 54 of projections 28 and 30. The shorter springs or movable arms 34 are wider and provided with outwardly sloping upper end-portions 56 against which the lower edge of the slide presses as it is forced downwardly between the sides 50 and 52 of the arms or springs 32. Since arms 34 are yieldable they are moved outwardly slightly and away from bearing contact with movable arms 32 and at such time serve to hold the slide in engagement with the vertical surfaces of flanges 24 and 25.

The arrangement just described employing two separate pairs of movable arms or springs adjacent each projection opening allows a rectangular slide of a predetermined width and a greater predetermined length to be selectively positioned in the carrier for projection purposes either in an upright or vertical position or upon its side as desired. It will be seen that a square slide of dimensions to fit the spacing between the edges 50 and 52 of the springs 32 may be positioned therein either in a vertical position or on its side and in either position be properly located or centered for projection purposes.

In the carrier disclosed in Fig. 1 a pair of projection openings have been disclosed but it will be obvious that a slide carrier comprising a greater number of projection openings might readily be provided with the present invention. The lower edge 60 of the portion 12 serves as guide means for the slide carrier when positioned in the guideways or channels of a conventional projector and the upper end-portion 62 of intermediate member 18 is arranged to engage the upper of such channels. Stop means in the form of pins 64 may be provided at opposite ends of the slide carrier for limiting the travel of the carrier in the projector. Obviously other types of limiting means may be employed for such purposes and may even be arranged to be moved to an inoperative position to allow the carrier to be easily removed from the projector when not being used.

While the main supporting or structural portion of the carrier may be conveniently cast in metal or molded of plastic or the like as one integral member, it will be obvious that such may be formed of a plurality of individual members, of wood or metal or both, and adequately serve in the present invention. In such case, these parts would form a rigid unitary structure to which would be secured the springs 32 and 34, the stops 64 and the handles 66 upon the opposite ends of the carrier.

Having described the invention in detail, I desire to secure by Letters Patent the following.

I claim:

1. A slide carrier comprising an elongated rigid base portion, a pair of upstanding rigid arms carried thereby and arranged in spaced relation so as to provide a projection opening therebetween, a recess in each of said arms adjacent said opening, each recess being formed in part by a vertical transverse wall and a vertical longitudinal wall, said transverse walls being spaced relative to each other so as to provide therebetween a slide-receiving space of predetermined longitudinal dimension, a movable arm in each of said recesses arranged to yieldingly engage a side of a slide and urge the opposite side thereof into engagement with said vertical longitudinal walls when occupying said space and overlying said opening, the adjacent edges of said movable arms being spaced relative to each other so as to define therebetween a second slide-receiving space of lesser predetermined longitudinal dimension, and a second movable arm in each of said recesses and arranged to yieldably engage a side of a slide and urge the opposite side thereof into engagement with said vertical longitudinal walls when occupying said second space and overlying said opening.

2. A carrier for positioning a slide or the like in a projector for projection purposes, said carrier comprising an elongated rigid base portion, a pair of rigid upstanding portions carried thereby, said upstanding portions being arranged in spaced relation relative to each other so as to define a slide-receiving space of predetermined longitudinal dimension therebetween, inwardly projecting vertically disposed flanges carried by said upstanding portions and having side surfaces thereon arranged for engagement by a side of a slide when occupying said space and having the inner edges thereof spaced from each other so as to provide a projection opening therebetween, a first pair of movable arms supported by said carrier and positioned inwardly of said upstanding portions and arranged to resiliently urge the slide occupying said slide receiving space toward said flanges, the inner edges of said movable arms being arranged in spaced relation relative to each other so as to define a second slide-receiving space of lesser predetermined longitudinal dimension therebetween, and a second pair of movable arms supported by said carrier and arranged to resiliently urge a slide when occupying said second space toward said flanges.

3. A slide carrier for selectively positioning a slide of different predetermined length and width in a projector with its longer dimension disposed either longitudinally or vertically of the carrier as desired, said carrier comprising an elongated rigid base portion, a pair of rigid upstanding arms carried thereby, said arms being arranged in a predetermined spaced relation for defining a slide-receiving space therebetween suitable to accommodate the long dimension of said slide, inwardly projecting vertical flanges carried by said upstanding arms and spaced from each other so as to define a projection opening therebetween, a pair of movable arms supported by said carrier and arranged to resiliently urge a side of said slide when occupying said space into engagement with said flanges, the inner edges of said movable arms being arranged in such predetermined spaced relation between said upstanding arms as to define a second slide-receiving space of a longitudinal dimension suitable to accommodate the shorter dimension of said slide therebetween, and a second pair of movable arms supported by said carrier and arranged to resiliently urge said slide when occupying said second space into engagement with said flanges.

4. A slide carrier for selectively positioning a slide of a predetermined length and a different predetermined width in a projector with its longer dimension disposed longitudinally or vertically of said carrier as desired and centrally relative to a projection opening formed therein, said carrier comprising an elongated rigid base portion, a pair of upstanding rigid arms carried thereby and arranged in spaced relation for providing said projection opening therebetween, a pair of vertically extending recesses formed in said arms adjacent said opening, a longitudinal recess formed in said base portion adjacent said opening, said pair of recesses providing transversely disposed walls so spaced relative to each other as to define a slide-receiving space of predetermined longitudinal dimension therebetween and also providing longitudinally disposed walls adjacent said opening, a movable arm in each recess of said pair of recesses for yieldable engagement with a side of a slide for urging the opposite side thereof into engagement with said longitudinally disposed walls when occupying said space and overlying said projection opening, the adjacent edges of said movable arms being so spaced relative to each other as to define a second slide-receiving space of lesser longitudinal dimension between said movable arms, and a second movable arm in each recess of said pair of recesses and arranged to yieldably engage a side of a slide for urging the opposite side thereof into engagement with said longitudinally disposed walls when occupying said second space and overlying said projection opening, said longitudinal recess accommodating an edge portion of said slide so as to be properly located relative to said opening for projection purposes.

5. A slide carrier comprising an elongated rigid base portion, a pair of upstanding rigid arms arranged in spaced relation thereon for defining a slide-receiving space therebetween, spaced flanges projecting inwardly from said upstanding arms and defining a projection opening therebetween, movable arms positioned at opposite sides of said opening and arranged to yieldably maintain a slide when occupying said space in engagement with said flanges and overlying said opening, said movable arms being spaced from each other so as to define a second smaller slide-receiving space therebetween, second movable arms on said carrier and positioned adjacent opposite sides of said opening and arranged to overlie said first movable arms, said second movable arms having portions extending inwardly of said first movable arms to provide means for engaging a side of a slide when occupying said second space and yieldably urging said slide into engagement with said flanges, whereby rectangular slides of a predetermined length and a different predetermined width may be selectively positioned in said carrier in an upright position or upon one of their side edges as desired for projection purposes.

6. A slide carrier comprising an elongated rigid base portion, a pair of rigid vertically disposed arms carried in spaced relation thereby, a vertically extending recess formed in each arm so as to provide a transverse vertical wall portion and a longitudinal vertical wall portion, said transverse wall portions being so spaced relative to each other as to define a slide receiving space of predetermined longitudinal dimension therebetween, yieldable means supported by said carrier adjacent each recess and arranged to engage a side of a slide occupying said space so as to hold the opposite side thereof against said longitudinal wall portions, the adjacent edge portions of said yieldable means defining a second slide receiving space of lesser predetermined longitudinal dimension, and additional yieldable means supported by said carrier adjacent each recess and arranged to engage a side of a slide occupying said second space so as to hold the opposite side thereof against said longitudinal wall portions of said recesses.

KENNARD W. HARPER.

REFERENCES CITED

The following references are of record in the file of this patent:

UNITED STATES PATENTS

| Number | Name | Date |
|---|---|---|
| 1,139,165 | Cobb | May 11, 1915 |
| 2,153,221 | Wittel | Apr. 4, 1939 |
| 2,319,029 | Babcock et al. | May 11, 1943 |